US009004430B2

(12) United States Patent
Conner

(10) Patent No.: US 9,004,430 B2
(45) Date of Patent: Apr. 14, 2015

(54) ARTICULATING MOUNT FOR A DISPLAY

(71) Applicant: Imperial Stamping Corporation, Elkhart, IN (US)

(72) Inventor: Patrick A. Conner, Elkhart, IN (US)

(73) Assignee: Imperial Stamping Corporation, Elkhart, IN (US)

( * ) Notice: Subject to any disclaimer, the term of this patent is extended or adjusted under 35 U.S.C. 154(b) by 221 days.

(21) Appl. No.: 13/627,194

(22) Filed: Sep. 26, 2012

(65) Prior Publication Data
US 2013/0082156 A1 Apr. 4, 2013

Related U.S. Application Data

(60) Provisional application No. 61/541,670, filed on Sep. 30, 2011.

(51) Int. Cl.
F16M 11/04 (2006.01)
H04N 5/655 (2006.01)
F16M 11/08 (2006.01)
F16M 11/20 (2006.01)
F16M 13/02 (2006.01)

(52) U.S. Cl.
CPC ............... *H04N 5/655* (2013.01); *F16M 11/08* (2013.01); *F16M 11/2021* (2013.01); *F16M 11/2085* (2013.01); *F16M 11/2092* (2013.01); *F16M 13/02* (2013.01); *F16M 2200/022* (2013.01); *F16M 2200/061* (2013.01); *Y10S 248/919* (2013.01); *Y10S 248/92* (2013.01)

(58) Field of Classification Search
CPC ..... F16M 11/04; F16M 11/043; F16M 11/06; F16M 13/02

USPC ........... 248/277.1, 278.1, 281.11, 284.1, 324, 248/917, 919, 920, 921, 922, 274.1
See application file for complete search history.

(56) References Cited

U.S. PATENT DOCUMENTS

| 4,589,621 | A | 5/1986 | Hunt et al. |
| 5,342,009 | A | 8/1994 | Lehner |
| 5,462,347 | A | 10/1995 | Vogelgesang et al. |
| 5,765,797 | A | 6/1998 | Greene et al. |
| 6,170,408 | B1 | 1/2001 | Gombrich |
| 6,288,891 | B1 | 9/2001 | Hasegawa et al. |
| 6,343,006 | B1 * | 1/2002 | Moscovitch et al. .... 361/679.04 |
| 6,427,977 | B1 | 8/2002 | De Sisti et al. |
| 6,604,722 | B1 | 8/2003 | Tan |
| 6,905,101 | B1 * | 6/2005 | Dittmer ...................... 248/274.1 |
| 6,915,996 | B2 * | 7/2005 | Lin ........................... 248/288.51 |
| 7,264,212 | B2 * | 9/2007 | Hung ......................... 248/282.1 |

(Continued)

FOREIGN PATENT DOCUMENTS

EP 1878544 A1 1/2008

*Primary Examiner* — Terrell McKinnon
*Assistant Examiner* — Eret McNichols
(74) *Attorney, Agent, or Firm* — Gardner, Linn, Burkhart & Flory, LLP

(57) ABSTRACT

An articulating mount for a television or other device with a display screen, permits in/out translation, left/right translation, and left/right roll or tilting movement of the display of the television or device. The left/right roll or tilting movement is about a generally horizontal axis that remains substantially perpendicular to the display screen of the device that is mounted to the bracket. The articulating mount further provides added retention and support of the television or device when a bracket of the mount is fully retracted, such as when the mount is used in a vehicle that is underway.

17 Claims, 7 Drawing Sheets

(56) References Cited

U.S. PATENT DOCUMENTS

| | | | |
|---|---|---|---|
| 7,338,022 B2* | 3/2008 | Hung | 248/278.1 |
| 7,398,950 B2 | 7/2008 | Hung | |
| 7,408,596 B2 | 8/2008 | Kunz | |
| 7,413,152 B1 | 8/2008 | Chen | |
| 7,448,584 B2* | 11/2008 | Chen et al. | 248/278.1 |
| 7,487,943 B1* | 2/2009 | Gillespie | 248/282.1 |
| 7,513,469 B1* | 4/2009 | Ciungan | 248/161 |
| 7,571,883 B2* | 8/2009 | Van Groesen et al. | 248/282.1 |
| 7,643,276 B2* | 1/2010 | Shin | 361/679.06 |
| 7,673,838 B2* | 3/2010 | Oddsen et al. | 248/278.1 |
| 7,832,700 B2* | 11/2010 | Ciungan | 248/324 |
| 7,878,470 B2 | 2/2011 | Oh et al. | |
| 7,954,780 B2* | 6/2011 | Dittmer | 248/284.1 |
| 8,042,778 B2* | 10/2011 | Wu et al. | 248/282.1 |
| 8,245,990 B2* | 8/2012 | Huang | 248/276.1 |
| 8,523,129 B2* | 9/2013 | Stifal et al. | 248/284.1 |
| 8,561,955 B2* | 10/2013 | Stemple | 248/278.1 |
| 8,693,172 B2* | 4/2014 | Russell et al. | 361/679.01 |
| 8,888,062 B2* | 11/2014 | Novin | 248/281.11 |
| 8,905,365 B2* | 12/2014 | Stifal et al. | 248/284.1 |
| 2002/0011544 A1* | 1/2002 | Bosson | 248/121 |
| 2004/0262474 A1* | 12/2004 | Boks et al. | 248/276.1 |
| 2005/0110911 A1 | 5/2005 | Childrey et al. | |
| 2006/0175476 A1* | 8/2006 | Hasegawa et al. | 248/125.1 |
| 2006/0186294 A1* | 8/2006 | Van Groesen et al. | 248/284.1 |
| 2006/0261227 A1* | 11/2006 | Petrick et al. | 248/276.1 |
| 2006/0284037 A1* | 12/2006 | Dittmer et al. | 248/285.1 |
| 2007/0023599 A1* | 2/2007 | Fedewa | 248/284.1 |
| 2007/0030405 A1 | 2/2007 | Childrey et al. | |
| 2007/0153459 A1* | 7/2007 | Wohlford et al. | 361/681 |
| 2007/0158515 A1 | 7/2007 | Dittmer et al. | |
| 2007/0205340 A1* | 9/2007 | Jung | 248/125.9 |
| 2007/0221807 A1* | 9/2007 | Park | 248/324 |
| 2007/0262210 A1* | 11/2007 | Oh et al. | 248/125.1 |
| 2008/0078906 A1* | 4/2008 | Hung | 248/276.1 |
| 2008/0105497 A1* | 5/2008 | Ashley et al. | 187/269 |
| 2009/0050763 A1* | 2/2009 | Dittmer | 248/284.1 |
| 2012/0241578 A1* | 9/2012 | Huang | 248/279.1 |
| 2013/0032682 A1* | 2/2013 | Bell | 248/277.1 |
| 2013/0187019 A1* | 7/2013 | Dittmer et al. | 248/277.1 |

\* cited by examiner

ARTICULATING MOUNT FOR A DISPLAY

CROSS REFERENCE TO RELATED APPLICATION

The present application claims the benefit of U.S. provisional application Ser. No. 61/541,670, filed Sep. 30, 2011, which is hereby incorporated herein by reference in its entirety.

FIELD OF THE INVENTION

The present invention relates generally to wall-supported mounting brackets for electronic devices such as televisions, computer monitors, media players, and the like.

BACKGROUND OF THE INVENTION

Wall brackets are often used for supporting electronics with visual displays, such as flat screen televisions and computer monitors, and electronics such as media players (e.g., CD and DVD players), and the like. Such devices may be supported at walls or other generally vertical support surfaces. Some wall brackets include mechanisms that permit the television or display device to be repositioned relative to the wall. However, televisions mounted in vehicles, and particularly motorcoaches and land-based recreational vehicles (RVs) can apply increased stresses to their mounting brackets due to movement of the vehicle. In addition, the vehicle may be parked or moored in a non-level orientation, so that the wall or other surface to which the television is mounted is either non-vertical, or is tilted at an angle.

SUMMARY OF THE INVENTION

The present invention provides an articulating mount for supporting a television, computer monitor, or other electronic device (typically having a display screen) along a wall or other generally vertical support surface. The articulating mount permits several degrees of freedom of movement for the television, including adjustment of the rotational angle of the television about a generally horizontal axis that is substantially perpendicular to the plane of the television's display screen. In addition, the articulating mount provides securing elements that lend additional support to the bracket when the television is in a stowed position. One or more stabilizers incorporated into the bracket provide added stability to the bracket-mounted television when the television is in the stowed configuration.

According to one form of the present invention, an articulating support is provided for mounting a TV or other device having a display to a wall surface. The articulating support includes a wall bracket, a Display bracket, at least one linkage arm disposed between the brackets, and a generally horizontal pivot mount. The wall bracket attaches to a wall or other substantially vertical support surface, while the display bracket is configured to receive a television or other electronic device having a display screen. The linkage arm has opposite end portions that are pivotably coupled between the display bracket and the wall bracket to mount the display bracket to the wall bracket and thereby permit at least in/out translation and side-to-side translation of the display bracket. The generally horizontal pivot mount is located at the display bracket or the wall bracket, and permits the display bracket to rotate about a generally horizontal axis that is substantially perpendicular to the display screen of the television.

In one aspect, the linkage arm is part of a scissor mechanism or pivot arm linkage that includes a plurality of linkage arms coupled between the display bracket and the wall bracket. The pivot arm linkage supports the display bracket for movement relative to the wall bracket, thus permitting at least in/out translation and side-to-side translation of the display bracket. The pivot arm linkage includes at least first and second linkage arms, each having opposite end portions. The first linkage arm is pivotably coupled to the wall bracket and to the second linkage arm, while the second linkage arm is pivotably coupled to the first linkage arm and to the display bracket.

In another aspect, the generally horizontal pivot mount is selectively lockable or securable against rotation about the substantially horizontal axis. For example, the generally horizontal pivot mount may include a horizontal shaft that is rotatably supported in a sleeve, with a lock member that is coupled to the horizontal shaft. The lock member is repositionable (such as by tightening) between a locking position and a non-locking position. Optionally, the shaft includes a threaded shaft portion that extends outwardly from the sleeve, and the lock member is a threaded nut that is received on the threaded shaft portion. The threaded nut is repositionable by rotating the nut relative to the shaft, with the non-locking position(s) of the nut corresponding to selected degrees or amounts of frictional resistance to rotation of the shaft in the sleeve.

In yet another aspect, the articulating support includes a retaining element coupled to either the wall bracket or the display bracket and configured to releasably engage at least one of the linkage arms when the pivot arm linkage is in a retracted position. The retaining element releasably secures the linkage arm (or linkage arms of a pivot arm linkage) in the retracted position. Optionally, the retaining element is a resilient snap-lock clip.

In still another aspect, the articulating support includes a wall bracket pivot member and a display bracket pivot member, each having a generally vertical axis of rotation. The first linkage arm is pivotally coupled to the wall bracket via the wall bracket pivot member, which permits pivotal movement of the first linkage arm in a generally horizontal plane. The second linkage arm is pivotably coupled to the display bracket by the display bracket pivot member, which permits the display bracket to move about the axis of rotation of the display bracket pivot member.

In a further aspect, the pivot arm linkage includes a pair of first linkage arms spaced vertically from one another, and a pair of second linkage arms spaced vertically from one another. Each of the first linkage arms is coupled to the wall bracket pivot member and also to a respective one of the second linkage arms, and each of the second linkage arms is further coupled to the display bracket pivot member.

In a still further aspect, the generally horizontal pivot mount is coupled between the display bracket and the display bracket pivot member.

In another aspect, the articulating support may include one or more bump-stops that project outwardly from one of the wall bracket and the display bracket, in the direction of the other bracket. Distal ends of the bump-stops either contact or lie in close proximity to the other of the wall bracket and display bracket, and resist pivoting movement of the display bracket relative to the wall bracket when the display bracket is fully retracted.

Therefore, the present invention provides an articulating support that selectively permits roll or tilting movement of a television about a generally horizontal axis that is substantially perpendicular to the display screen of a television mounted to the bracket. The bracket further provides added retention and support of the television when the bracket is fully retracted, and limits or prevents significant movement of the television particularly when the bracket is in the retracted configuration, such as when the bracket is mounted in a vehicle that is underway.

These and other objects, advantages, purposes, and features of the present invention will become apparent upon review of the following description in conjunction with the drawings.

DESCRIPTION OF THE PREFERRED EMBODIMENTS

Figure 1:
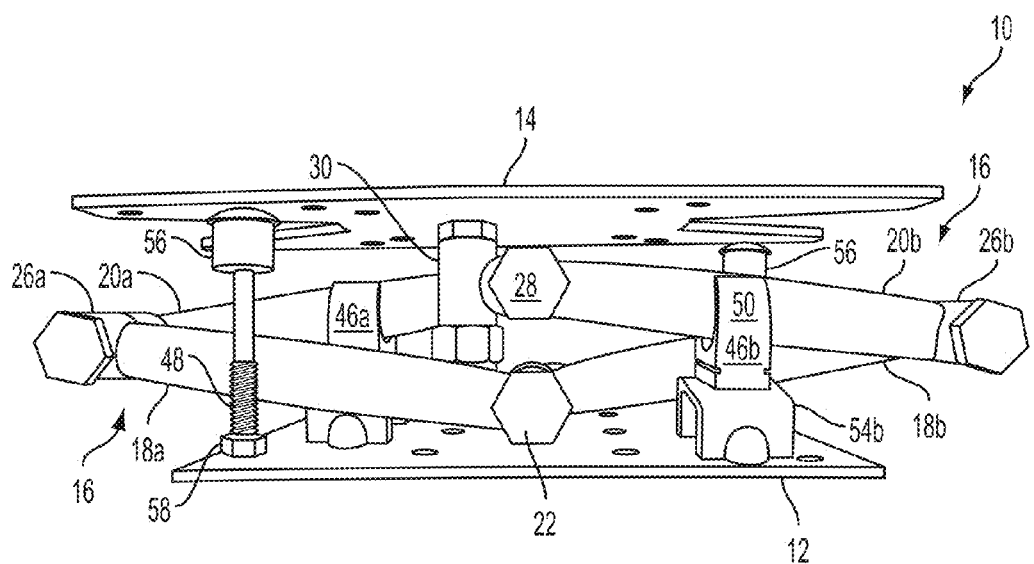
FIG. 1 is a top perspective view of an articulating television or electronic display support in accordance with the present invention, shown in a fully retracted configuration.
Figure 4:
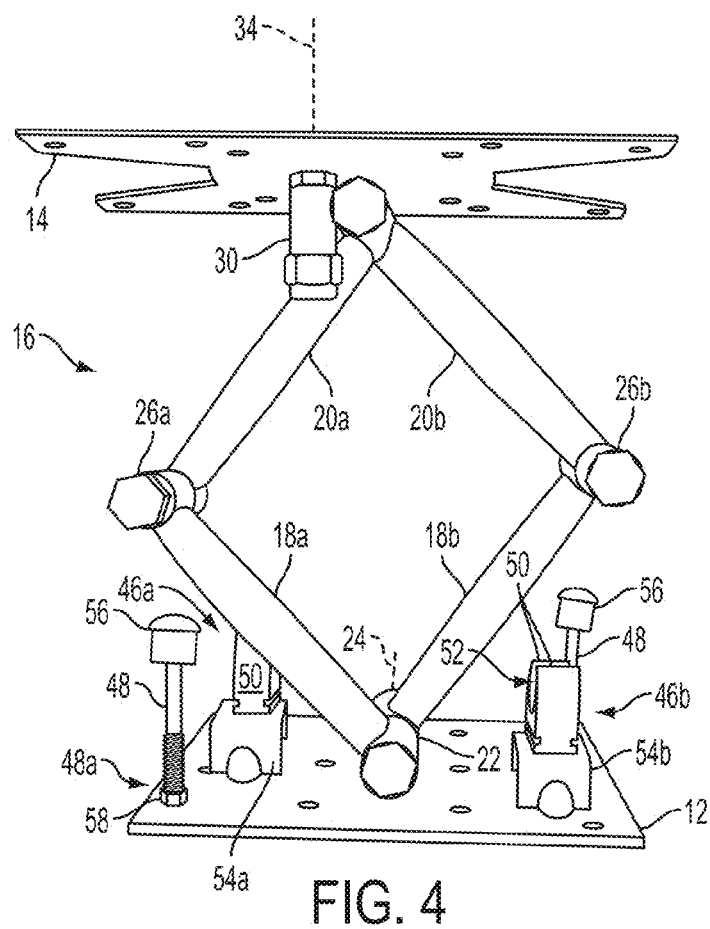
FIG. 4 is a top perspective view of the television bracket shown in a more fully extended position.
Figure 5:
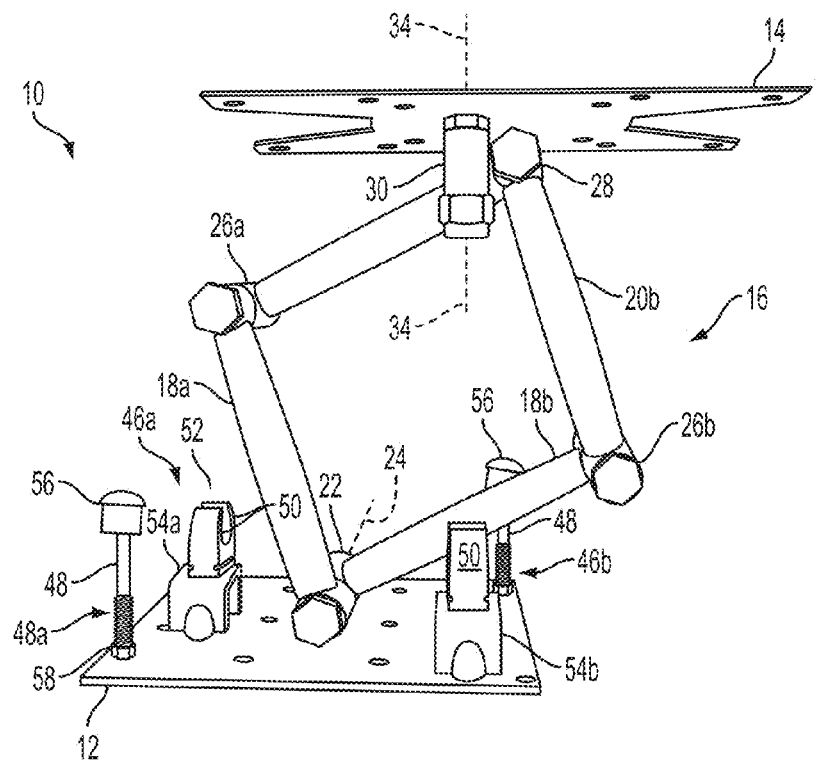
FIG. 5 is a top perspective view of the television bracket in the more fully extended configuration and skewed or translated to the right as viewed from above.
Figure 6:
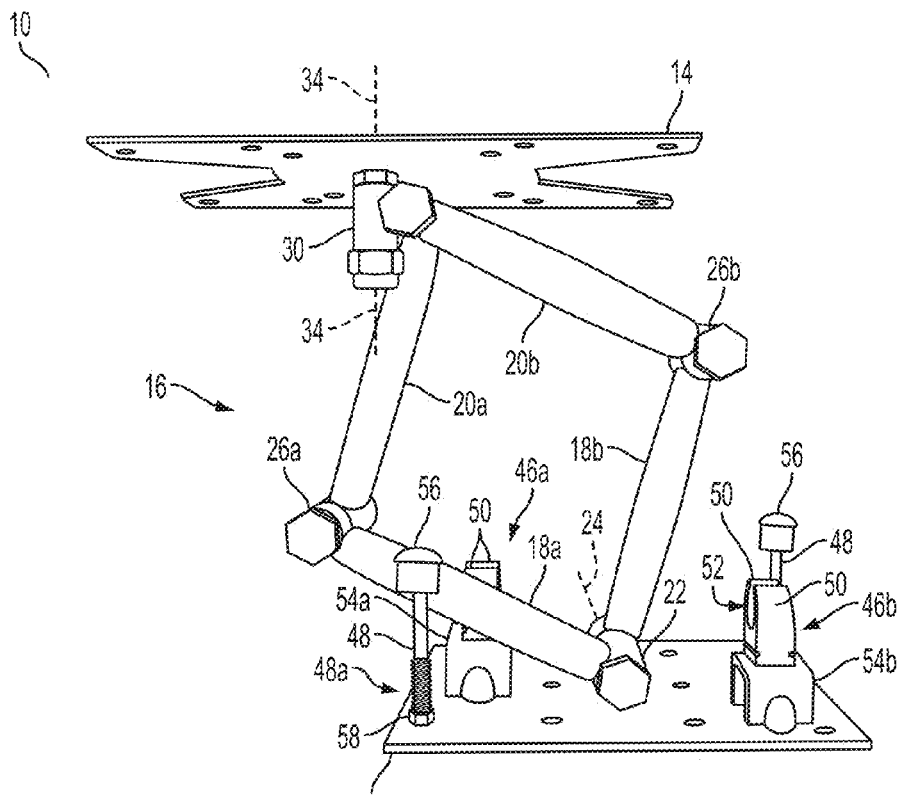
FIG. 6 is a top perspective view of the television bracket shown in the more fully extended configuration and skewed or translated to the left as viewed from above.

Referring now to the drawings and the illustrative embodiments depicted therein, an articulating support 10 includes a wall bracket 12 for coupling the support 10 to a wall or other substantially vertical support surface, a TV or display bracket 14 for supporting a television such as a flat-screen TV 15 (FIG. 2), or for a computer monitor, or other similar device or article, and a scissor mechanism or pivot arm linkage 16 for movably mounting the TV bracket 14 to wall bracket 12. Pivot arm linkage 16 includes a pair of first linkage arms 18a, 18b and a pair of second linkage arms 20a, 20b that are pivotably coupled at their opposite end portions to form a four-bar linkage between wall bracket 12 and TV bracket 14. Thus, pivot arm linkage 16 permits in/out translation of TV bracket 14 relative to wall bracket 12, such as shown in FIG. 1 (in-ward) and FIG. 4 (outward). In addition, pivot arm linkage 16 permits left/right translation or skewing of TV bracket 14 relative to wall bracket 12, such as shown in FIGS. 4-6. Although articulating support 10 is primarily described herein for use with televisions or similar electronic devices having visual displays, it will be appreciated that the articulating support could be readily adapted for use to support substantially any device or article, including those lacking display screens, without departing from the spirit and scope of the present invention.

Figure 3:
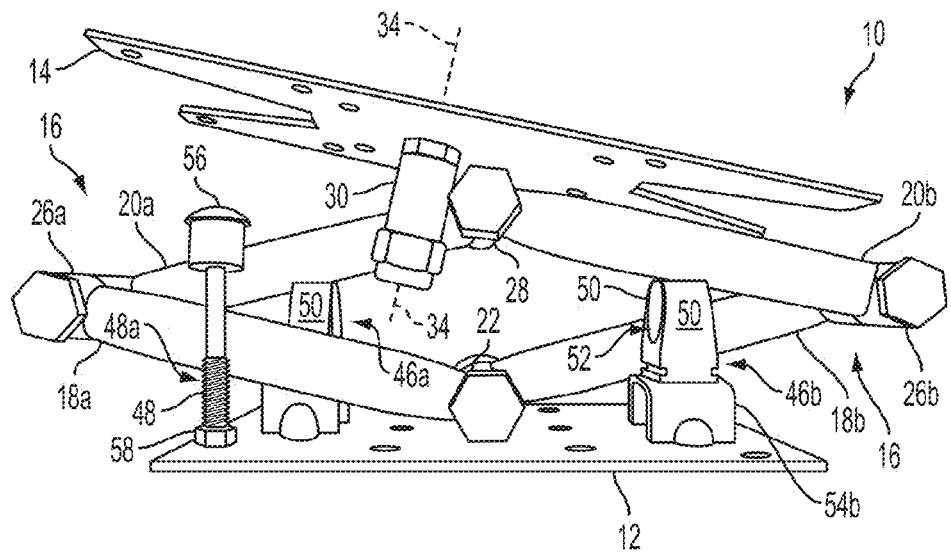
FIG. 3 is a top perspective view of the television bracket shown in the partially-extended position of FIG. 2, and with the television bracket pivoted or yawed to the right as viewed from above.
Figure 10:
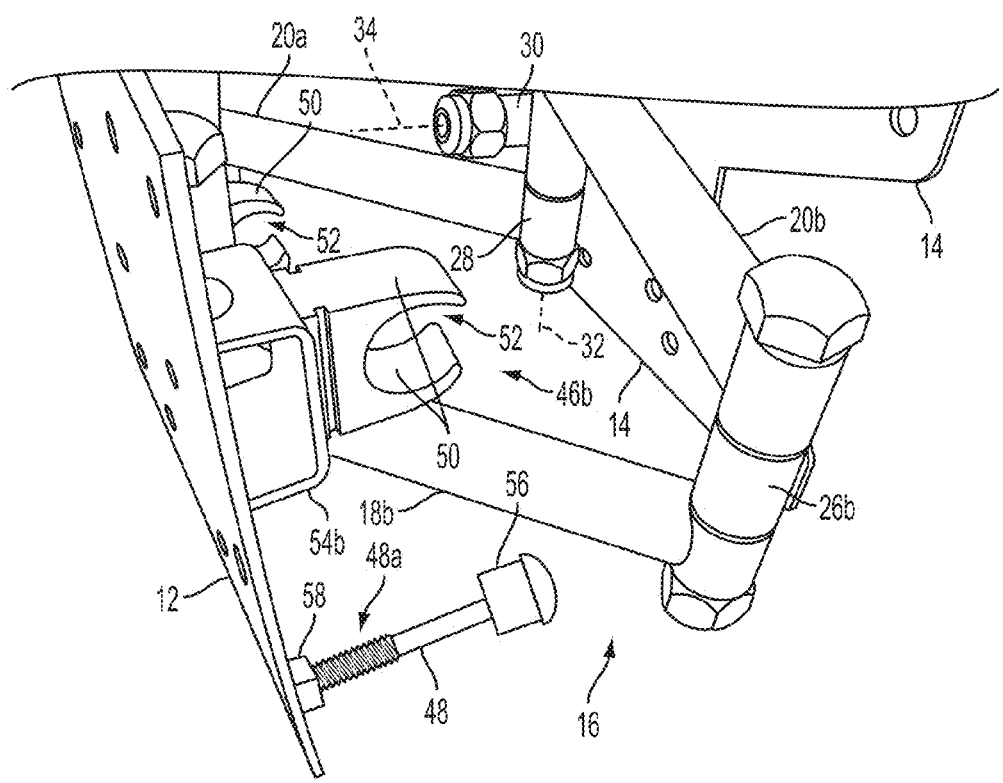
FIG. 10 is a side perspective view of a portion of the articulating support shown in a partially extended configuration.
Figure 11:
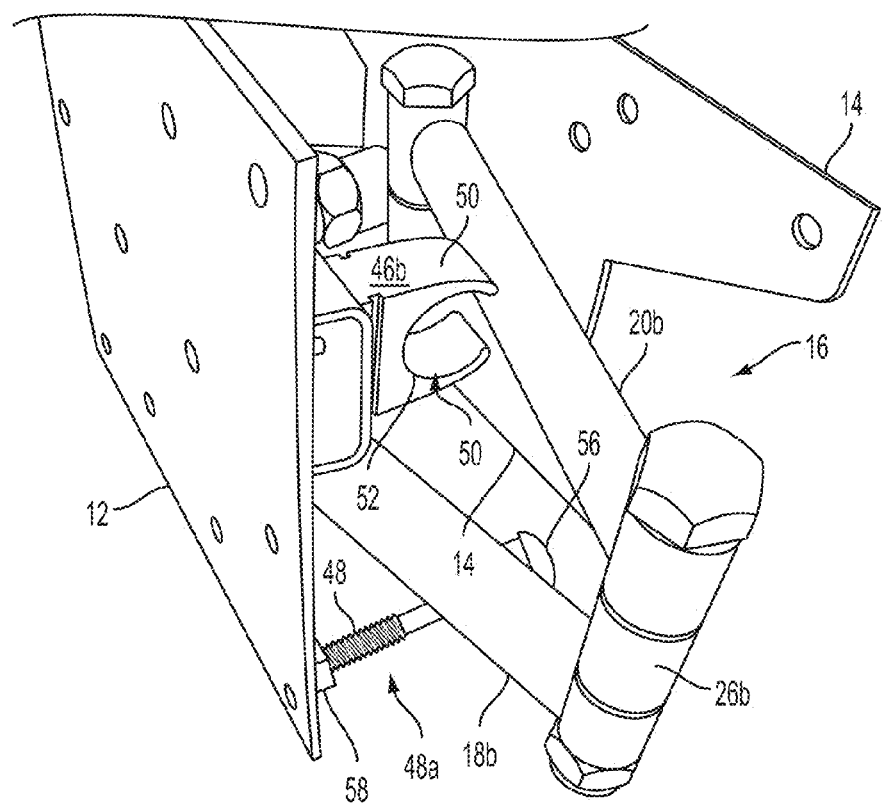
FIG. 11 is a side perspective view of the articulating support shown in a slightly-extended configuration.

First linkage arms 18a, 18b are both pivotably coupled to wall bracket 12 at a common wall bracket pivot member 22, which permits first linkage arms 18a, 18b to move together about a substantially vertical pivot axis 24 of pivot member 22, such as shown in FIGS. 5 and 6, and which also permits the first linkage arms 18a, 18b to pivot relative to one another such as shown in FIGS. 3 and 4. First linkage arm 18a is pivotably coupled to second linkage arm 20a at a linkage arm pivot 26a, while first linkage arm 18a is pivotably coupled to second linkage arm 20b at another linkage arm pivot 26b. Both second linkage arms 20a, 20b are pivotably coupled to a TV bracket pivot member 28, which is in turn coupled to TV bracket 14 via a horizontal pivot mount 30. TV bracket pivot member 28 permits TV bracket 14 to pivot or yaw about a substantially vertical pivot axis 32 (FIGS. 10, 12, and 13), while TV bracket pivot member 28 further permits second linkage arms 20a, 20b to pivot relative to one another, such as shown in FIGS. 3 and 4. Although articulating TV support 10 is shown with a pivot arm linkage made up of a plurality of linkage arms, it will be appreciated that a lesser or greater number of linkage arms may be used (including as few as one linkage arm coupled between TV bracket 14 and wall bracket 12), without departing from the spirit and scope of the present invention.

In the illustrated embodiment, the opposite ends of each linkage arm are formed as tubular hinge-pin receivers that are oriented perpendicularly to the longitudinal axis of the respective linkage arm. Thus, each end of each linkage arm is adapted to receive a hinge pin or bolt that pivotably couples the linkage arm to the end of another linkage arm, or to the wall bracket pivot member 22 or TV bracket pivot member 28, in a known manner. Optionally, the wall bracket pivot member 22, linkage arm pivots 26a, 26b, and TV bracket pivot member 28 may be tightened or loosened in a manner similar to that described below with reference to horizontal pivot mount 30, to adjust the level of frictional resistance to pivoting movement at each joint.

Figure 2:
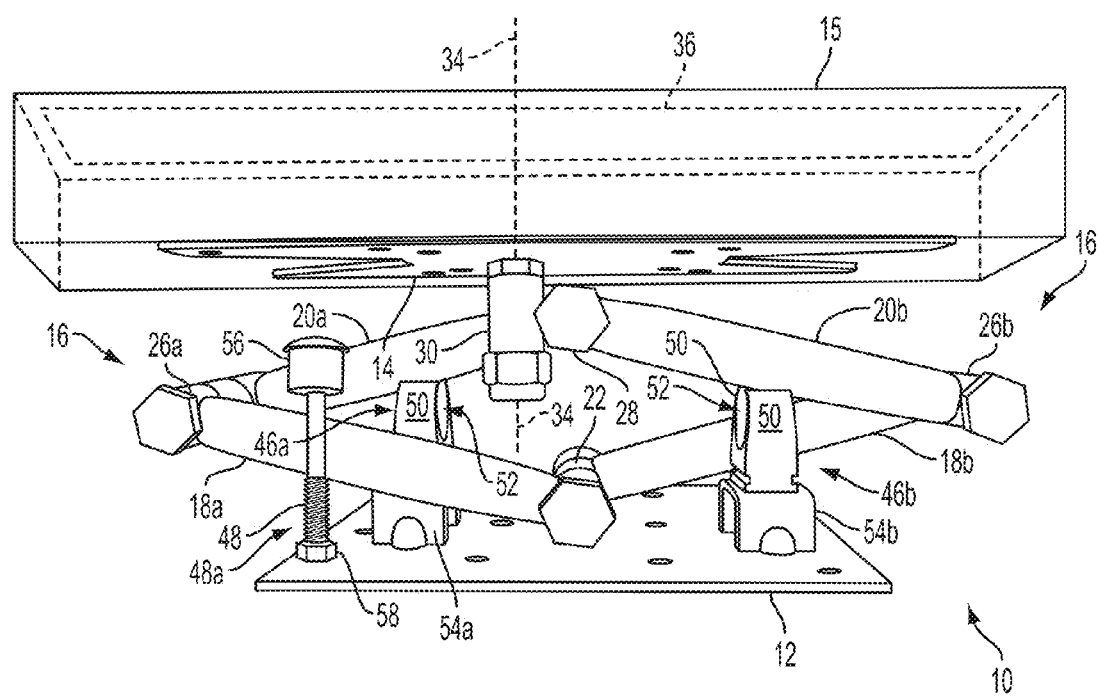
FIG. 2 is a top perspective view of the television bracket, shown extended partially outwardly from the fully retracted position of FIG. 1.
Figure 7:
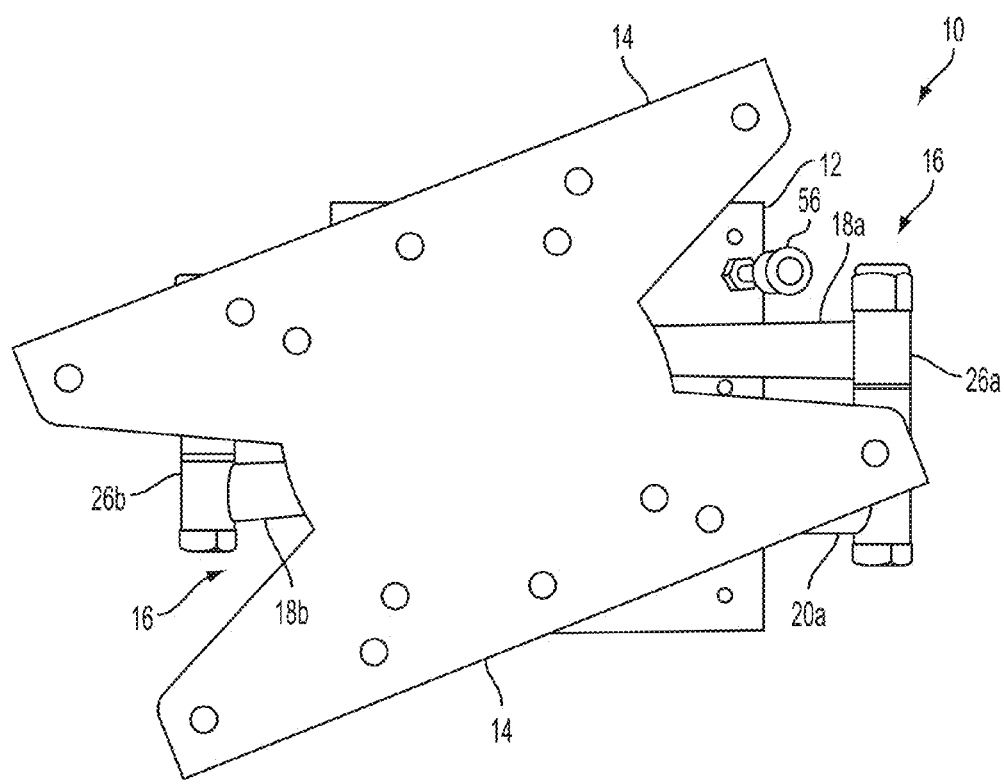
FIG. 7 is a front perspective view of the articulating support shown with the television bracket shown tilted to the left about a horizontal pivot axis.
Figure 8:
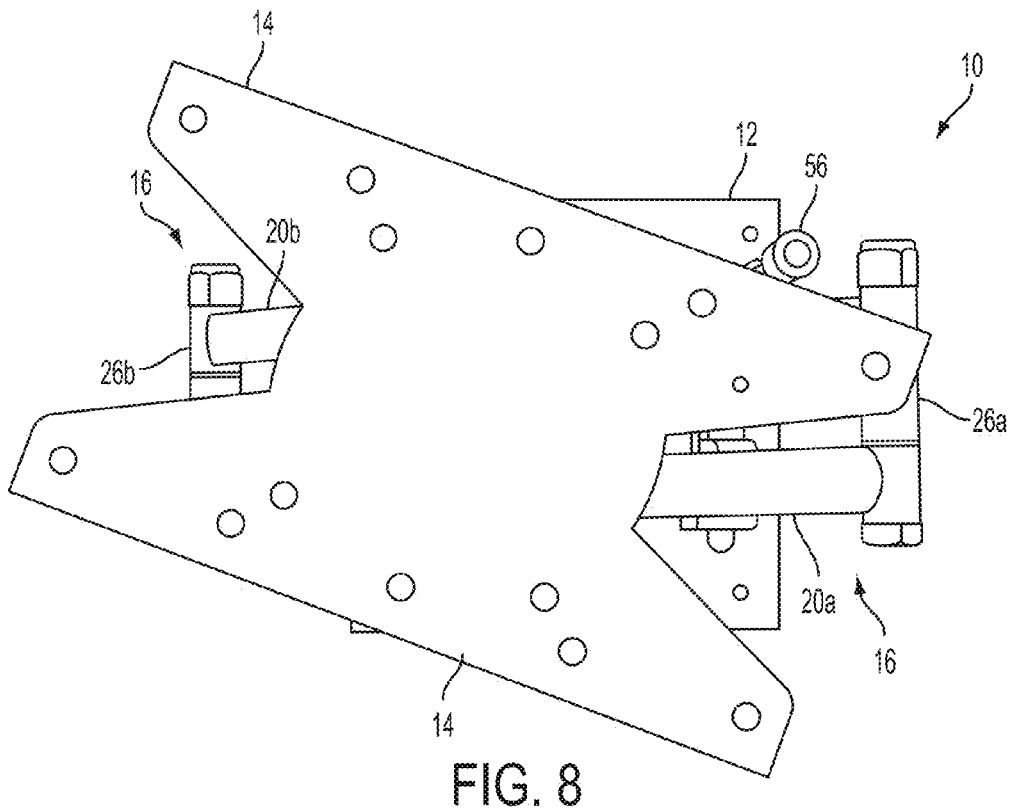
FIG. 8 is a front perspective view of the articulating support shown with the television bracket tilted to the right about a substantially horizontal pivot axis.
Figure 9:
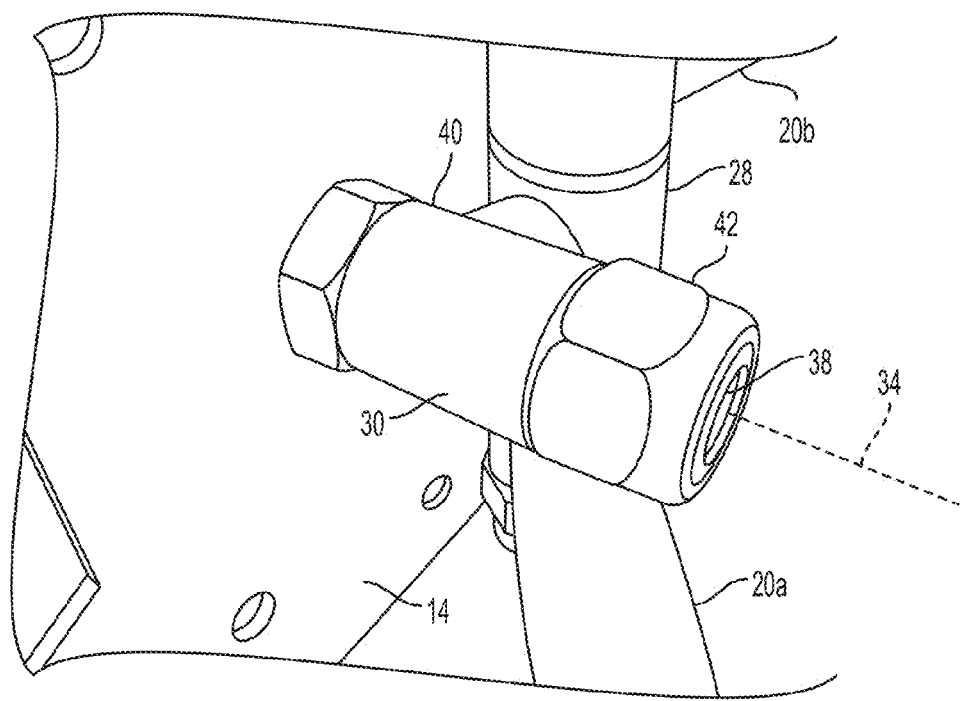
FIG. 9 is an enlarged perspective view of a horizontal pivot mount that couples the television bracket to the pivot arm linkage of the articulating support.
Figure 13:
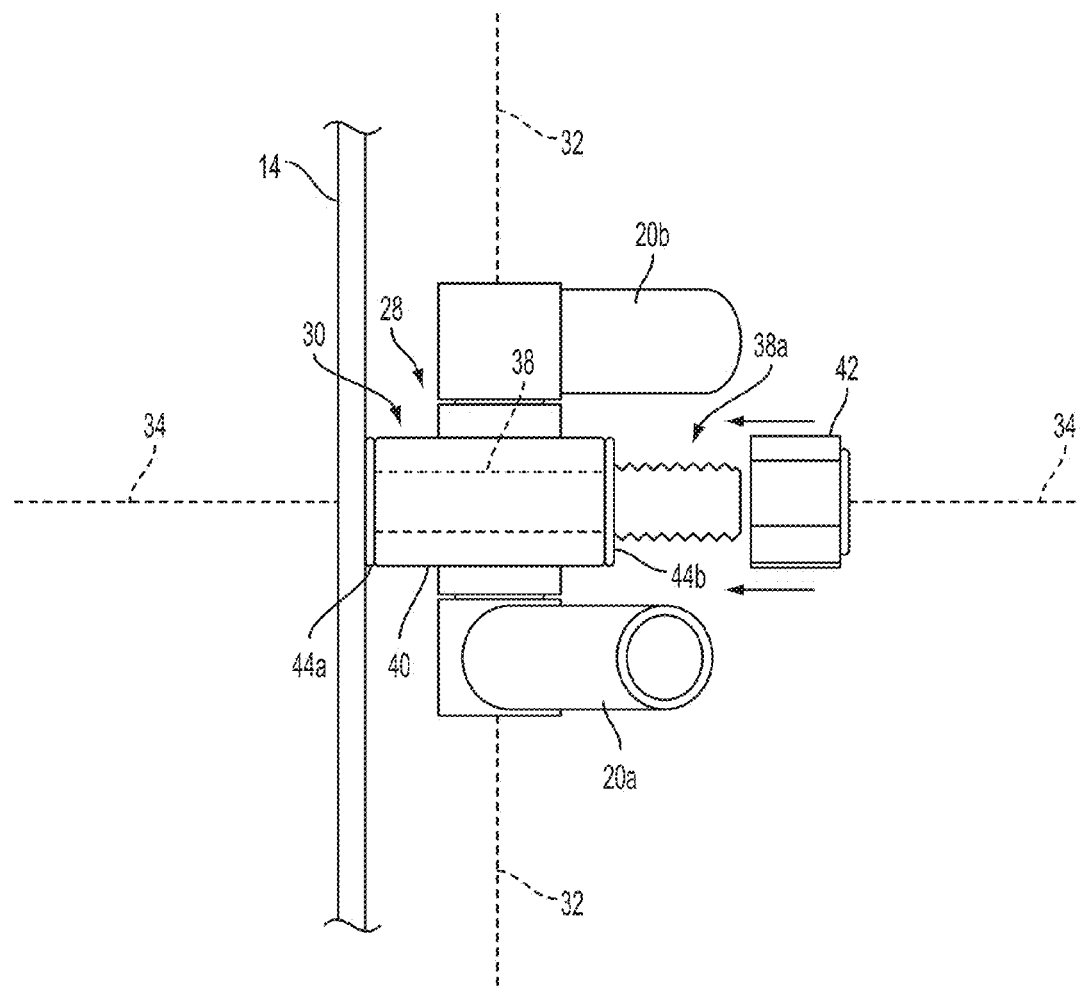
FIG. 13 is a side elevation of a forward portion of the articulating support.

Horizontal pivot mount 30 defines a generally horizontal pivot axis 34, about which TV bracket 14 and television 15 are able to roll or tilt in a left/right direction (FIGS. 2, 7 and 8). As best shown in FIGS. 2 and 3, horizontal pivot axis 34 remains substantially perpendicular to TV bracket 14 and a display screen 36 of television 15 (FIG. 2) regardless of the orientation of TV bracket 14. In the illustrated embodiment, and as best shown in FIGS. 9 and 13, horizontal pivot mount 30 includes an inner shaft 38 that extends perpendicularly rearwardly from TV bracket 14, with an outer sleeve 40 that is received on shaft 38 and is coupled to TV bracket pivot member 28. Inner shaft 38 includes a threaded end portion 38a that extends from outer sleeve 40 and receives a threaded fastener such as a lock nut 42. It will be appreciated that the horizontal pivot mount could instead be coupled at wall bracket pivot member 22, without departing from the spirit and scope of the present invention.

Optionally, a pair of friction washers 44a, 44b (FIG. 13) are positioned along shaft 38 on opposite sides of outer sleeve 40, which facilitate adjustment of the frictional resistance to rotation of sleeve 40 on shaft 38. When lock nut 42 is tightened along threaded portion 38a of inner shaft 38, friction washer 44a is compressed between TV bracket 14 and outer sleeve 40, and friction washer 44b is compressed between sleeve 40 and lock nut 42. Thus, a user can adjust the tightness of lock nut 42 on shaft 38 to adjust the degree of resistance to left/right tilting of TV bracket 14 and television 15 about the horizontal pivot axis 34 of pivot mount 30. Optionally, lock nut 42 may be tightened sufficiently to substantially limit or prevent rotation of TV bracket 14 and television 15 about horizontal pivot axis 34, thus locking or substantially securing the left/right tilt angle of television 15 and its display screen 36 at a desired angle. For example, if articulating TV support 10 is mounted in a recreational vehicle that is parked on a three degree slope, a user may loosen lock nut 42 sufficiently to enable manual rotation of television 15 by three degrees about horizontal pivot axis 34 so that the television is level for proper viewing. Moreover, this adjustability allows wall bracket 12 to be mounted in a non-level orientation, and the rotational angle of TV bracket 14 can be adjusted about horizontal pivot axis 34 to compensate.

Articulating TV support 10 further includes a pair of retaining elements in the form of snap-lock clips 46a, 46b, and a pair of stabilizing members in the form of bump-stops 48 (FIGS. 1-5 and 10). Snap-lock clips 46a, 46b and bump-stops 48 provide additional support for TV bracket 14 and television 15, particularly when the articulating TV support 10 is mounted in a vehicle that is underway, causing dynamic loading due to jostling movements of the TV support 10 and television 15.

Figure 12:
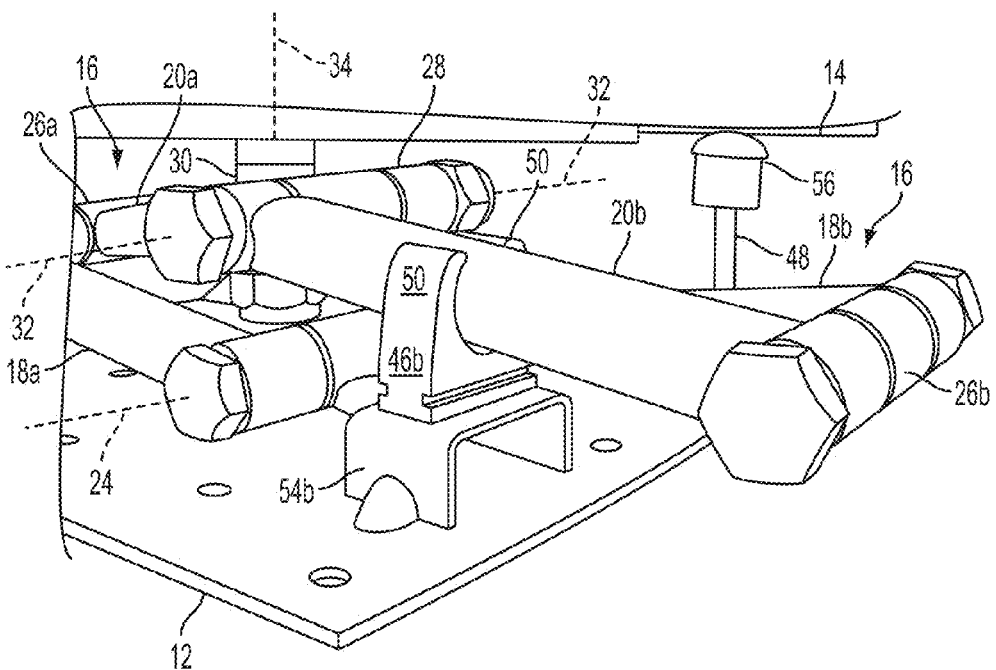
FIG. 12 is a side perspective view of the articulating support in a fully retracted configuration.

Each snap-lock clip 46a, 46b includes a pair of resilient fingers or projections 50 that form an opening 52, which is sized and shaped to receive a corresponding one of second linkage arms 20a, 20b when pivot arm linkage 16 and TV bracket 14 are in the fully retracted position of FIGS. 1 and 12. In the illustrated embodiment, each snap-lock clip 46a, 46b is mounted on a respective projection or bracket 54a, 54b that positions the clips a desired distance from wall bracket 12 to set or determine the distance between TV bracket 14 and wall bracket 12 in the fully retracted position of FIGS. 1 and 12. In the illustrated embodiment, the maximum diameter of opening 52 is approximately equal to the outer diameter of second linkage arms 20a, 20b. The distal ends of resilient fingers 50 are spaced more closely together than the outer diameter of second linkage arms 20a, 20b so that snap-lock clips 46a, 46b initially resist insertion of the respective second linkage arms 20a, 20b into openings 52. Thus resilient fingers 50 initially spread apart to receive the second linkage arms, and the second linkage arms are releasably held in openings 52 by resilient fingers 50 until sufficient force is applied to pull second linkage arms 20a, 20b outwardly from the snap-lock clips 46a, 46b. This spreads the resilient fingers 50 apart and allows the second linkage arms 20a, 20b to be drawn out of the openings 52 (e.g., compare FIG. 1 to FIG. 2 and FIG. 12 to FIG. 11). Thus, snap-lock clips 46a, 46b securely retain articulating TV support 10 in the fully retracted position or configuration of FIGS. 1 and 12 under typical loads encountered in a moving vehicle. This also reduces the stresses applied to wall bracket pivot member 22, linkage arm pivot 26a, 26b, and TV bracket pivot member 28, reducing the likelihood of excessive wear or damage to articulating TV support 10 when the vehicle is underway.

Bump-stops 48 project generally perpendicularly from wall bracket 12 in the direction of TV bracket 14. In the illustrative embodiment, a protective and/or soft or resilient cap or cover 56 is provided at a distal end portion of each bump-stop 48. Cap 56 contacts or lies in close proximity to TV bracket 14 when the TV bracket is fully retracted, such as shown in FIGS. 1 and 12. Each bump-stop 48 includes a threaded end portion 48a that is threadedly received in a weld nut 58 attached to a forward face of wall bracket 12. This permits fine adjustments of the distance that each bump-stop element 48 projects from wall bracket 12 so that the bump-stops 48 can be adjusted to contact TV bracket 14 with caps 56 to a desired degree (e.g. to slightly compress each cap 56) when TV bracket 14 is fully retracted such as shown in FIGS. 1 and 12.

By contacting or lying in close proximity to TV bracket 14, bump-stops 48 helps to stabilize TV bracket 14 and television 15 when mounted in a vehicle that is underway. In particular, by placing the bump-stops 48 in diagonally opposite corners of wall bracket 12, the bump-stops resist both left/right pivoting movement of TV bracket 14 about a vertical axis (e.g., axis 32) and further resist up/down tilt or pivoting movement of TV bracket 14 about a substantially horizontal axis (i.e., orthogonal to both vertical pivot axis 32 and horizontal pivot axis 34).

Articulating TV support 10 may be made substantially from steel or any sufficiently strong material for supporting the dynamic loads of a heavy television in a vehicle that is underway. In the illustrated embodiment, wall bracket 12 and TV bracket 14 are each made from stamped sheet steel and include respective pluralities of holes or openings for receiving fasteners used to attach the brackets to a wall surface or television, respectively. First linkage arms 18a and second linkage arms 20a, 20b may be made from tubular steel. Snap-lock clips 46 and caps 56 may be made from substantially any resilient material, including natural or synthetic rubber, resinous plastic, nylon, or the like, or may even be made from harder materials if desired. For example, snap-lock clips 46a, 46b could be made from spring steel.

Thus, the articulating TV support of the present invention enables forward/aft translating movement of a television or similar electronic item relative to a wall surface or other generally vertical support surface, and further permits left/right translation of the television, left/right pivoting of the television about a substantially vertical axis, and left/right roll or tilting of the television about a generally horizontal axis that is substantially perpendicular to the television screen. This allows for adjustment to the viewing angle of the television, such as to compensate for a tilted vehicle. In addition, retaining elements (e.g., snap-lock clips) and bump-stops help to stabilize and secure the articulating TV support and a television or other device when the TV support is fully retracted in a stowed configuration, such as when the vehicle is underway.

Changes and modifications to the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property is claimed are defined as follows:

1. An articulating support for mounting a television or other electronic device with a display screen to a wall surface, said support comprising:
 a wall bracket for attachment to a wall or other substantially vertical support surface;
 a display bracket for attachment to an electronic device having a display screen;
 a linkage arm configured to movably mount said display bracket to said wall bracket to permit at least in/out translation and side-to-side translation of said display bracket, said linkage arm having opposite end portions that are pivotably coupled between said display bracket and said wall bracket to permit movement of said display bracket relative to said wall bracket; and a generally horizontal pivot mount at one of said display bracket and said wall bracket, said generally horizontal pivot mount comprising a horizontal shaft that is rotatably supported in a sleeve, said horizontal shaft including a threaded shaft portion extending outwardly from said sleeve:

a lock member comprising a threaded nut coupled to said threaded shaft portion of said horizontal shaft and repositionable between a locking position and a non-locking position via rotation of said nut relative to said shaft, wherein said non-locking position of said threaded nut corresponds to a selected degree of frictional resistance to rotation of said horizontal shaft in said sleeve;

wherein said horizontal pivot mount is configured to permit said display bracket to rotate about a generally horizontal axis that is substantially perpendicular to the display screen of the electronic device, and wherein said generally horizontal pivot mount is selectively lockable against rotation about the substantially horizontal axis.

2. The articulating support of claim 1, further comprising a friction disc positioned along said shaft and between at least one of said display bracket and said lock member.

3. The articulating support of claim 1, further comprising a retaining element coupled to one of said wall bracket and said display bracket, said retaining element configured to releasably engage said linkage arm when said linkage arm is in a retracted position, to thereby releasably secure said linkage arm in the retracted position.

4. The articulating support of claim 3, wherein said retaining element comprises a resilient snap-lock clip that is secured to said wall bracket.

5. The articulating support of claim 1, wherein said linkage arm comprises a first linkage arm of a pivot arm linkage, said pivot arm linkage further comprising a second linkage arm, each of said linkage arms having opposite end portions, said first linkage arm pivotably coupled to said wall bracket and to said second linkage arm at its respective opposite end portions, and said second linkage arm pivotably coupled to said first linkage arm and to said display bracket at its respective opposite end portions.

6. The articulating support of claim 5, further comprising:
a wall bracket pivot member having a generally vertical axis of rotation, said first linkage arm being pivotably coupled to said wall bracket via said wall bracket pivot member for pivotal movement of said first linkage arm in a generally horizontal plane; and
a display bracket pivot member having a generally vertical axis of rotation, said second linkage arm being pivotably coupled to said display bracket via said display bracket pivot member for pivotal movement of said display bracket about said axis of rotation of said display bracket pivot member.

7. The articulating support of claim 6, wherein said pivot arm linkage comprises a pair of said first linkage arms in vertically spaced arrangement and a pair of said second linkage arms in vertically spaced arrangement, each of said first linkage arms being coupled to said wall bracket pivot member and to a respective one of said second linkage arms, and each of said second linkage arms further being coupled to said display bracket pivot member.

8. The articulating support of either claim 6, wherein said generally horizontal pivot mount is coupled between said display bracket and said display bracket pivot member.

9. The articulating support of claim 1, further comprising a bump-stop element for stabilizing said display bracket relative to said wall bracket when said linkage arm is in the retracted position, said bump-stop element being coupled to one of said wall bracket and said display bracket for engaging the other of said wall bracket and said display bracket when said linkage arm is in the retracted position.

10. The articulating support of claim 9, wherein said bump-stop element comprises a soft cap for engagement with said other of said wall bracket and said display bracket.

11. An articulating support for mounting a television or other electronic device with a display screen to a wall surface, said support comprising:
a wall bracket for attachment to a wall or other substantially vertical support surface;
a display bracket for attachment to an electronic device having a display screen;
a linkage arm configured to movably mount said display bracket to said wall bracket to permit at least in/out translation and side-to-side translation of said display bracket, said linkage arm having opposite end portions that are pivotably coupled between said display bracket and said wall bracket to permit movement of said display bracket relative to said wall bracket;
a generally horizontal pivot mount at one of said display bracket and said wall bracket, said horizontal pivot mount configured to permit said display bracket to rotate about a generally horizontal axis that is substantially perpendicular to the display screen of the electronic device; and
a bump-stop element for stabilizing said display bracket relative to said wall bracket when said linkage arm is in the retracted position, said bump-stop element being movably coupled to one of said wall bracket and said display bracket for engaging the other of said wall bracket and said display bracket when said linkage arm is in the retracted position, and to permit inward and outward adjustment of said bump-stop element.

12. The articulating support of claim 11, wherein said bump-stop element comprises a threaded shaft.

13. An articulating support for mounting a television or other electronic device with a display screen to a wall surface, said support comprising:
a wall bracket for attachment to a wall or other substantially vertical support surface;
a display bracket for attachment to an electronic device having a display screen;
a pivot arm linkage configured to movably mount said display bracket to said wall bracket to permit at least in/out translation and side-to-side translation of said display bracket, said pivot arm linkage including first and second linkage arms having respective opposite end portions, wherein said first linkage arm is pivotably coupled to said wall bracket and to said second linkage arm at its respective opposite end portions, and said second linkage arm is pivotably coupled to said first linkage arm and to said display bracket at its respective opposite end portions;
a retaining element coupled to one of said wall bracket and said display bracket, said retaining element configured to releasably engage said pivot arm linkage when said pivot arm linkage is in a retracted position, to thereby releasably secure said pivot arm linkage in the retracted position;
a bump-stop element for stabilizing said display bracket relative to said wall bracket when said pivot arm linkage is in the retracted position, said bump-stop element being coupled to one of said wall bracket and said display bracket for engaging the other of said wall bracket and said display bracket when said pivot arm linkage is in the retracted position; and a generally horizontal pivot mount at one of said display bracket and said wall bracket, said horizontal pivot mount comprising a horizontal shaft rotatably supported in a sleeve and including a threaded shaft portion extending outwardly from said sleeve, and a lock member comprising a threaded nut that is coupled to said threaded shaft portion and is repositionable between a locking position and a non-locking position via rotation of said nut relative to said shaft, wherein said non-locking position of said threaded nut corresponds to a selected degree of frictional resistance to rotation of said horizontal shaft in said sleeve;

wherein said horizontal pivot mount is configured to permit said display bracket to rotate about a generally horizontal axis that is substantially perpendicular to the display screen of the electronic device, and wherein said horizontal shaft is selectively lockable against rotation, relative to said sleeve, about the substantially horizontal axis.

14. The articulating support of claim 13, further comprising
a friction disc positioned along said horizontal shaft and adjacent at least one of said display bracket and said lock member.

15. The articulating support of claim 13, wherein said bump-stop element is movably coupled to said one of said wall bracket and said display bracket to permit inward and outward adjustment of said bump-stop element.

16. The articulating support of claim 15, wherein said bump-stop element comprises a threaded shaft and a soft cap for engagement with said other of said wall bracket and said display bracket.

17. The articulating support of claim 13, wherein said retaining element comprises a resilient snap-lock clip that is secured to said wall bracket.

* * * * *